US009789736B2

(12) United States Patent
Munezawa

(10) Patent No.: US 9,789,736 B2
(45) Date of Patent: Oct. 17, 2017

(54) PNEUMATIC TIRE

(71) Applicant: SUMITOMO RUBBER INDUSTRIES, LTD., Kobe-shi, Hyogo (JP)

(72) Inventor: Goro Munezawa, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 414 days.

(21) Appl. No.: 14/380,954

(22) PCT Filed: Mar. 11, 2013

(86) PCT No.: PCT/JP2013/056637
§ 371 (c)(1),
(2) Date: Aug. 26, 2014

(87) PCT Pub. No.: WO2013/137193
PCT Pub. Date: Sep. 19, 2013

(65) Prior Publication Data
US 2015/0151588 A1 Jun. 4, 2015

(30) Foreign Application Priority Data

Mar. 15, 2012 (JP) .................................. 2012-059098

(51) Int. Cl.
*B60C 11/04* (2006.01)
*B60C 11/12* (2006.01)
(Continued)

(52) U.S. Cl.
CPC ...... *B60C 11/1263* (2013.01); *B60C 11/0306* (2013.01); *B60C 11/04* (2013.01);
(Continued)

(58) Field of Classification Search
CPC ................. B60C 11/04; B60C 11/1263; B60C 2011/0381; B60C 11/12
See application file for complete search history.

(56) References Cited

U.S. PATENT DOCUMENTS

2002/0011291 A1 1/2002 Ikeda
2005/0183807 A1* 8/2005 Hildebrand ......... B60C 11/0306
152/209.2
(Continued)

FOREIGN PATENT DOCUMENTS

DE 4447417 A1 * 7/1996
EP 2 261 064 A1 12/2010
(Continued)

OTHER PUBLICATIONS

Machine translation for German 4,447,417 (no date).*
(Continued)

*Primary Examiner* — Steven D Maki
(74) *Attorney, Agent, or Firm* — Birch, Stewart, Kolasch & Birch, LLP

(57) ABSTRACT

A pneumatic tire has a high wet performance with keeping steering stability and wear resistance. Each of the middle land portions (12) is provided with middle sipes (15) and a middle sub-groove (16). Each of the middle sipes (15) has an arc-like shape such that an angle (θ1) with respect to the circumferential direction of the tire gradually increases from its inner end (15*i*) towards its outer end (15*o*). A circumferential length (L2) is in a range of from 0.6 to 1.0 times the arrangement pitch (P2) of the middle sipe (15). The middle sub-groove (16) communicates with a shoulder main groove (10), terminates without communicating with a crown main groove (9), and has an arc-like shape having an angle (θ2) that gradually increases from its inner end (16*i*) to its outer end (16*o*). A length (L3) of the middle sub-groove (16) is less than the length (L2) of the middle sipe, and the adjacent middle sipe (15) and middle sub-groove (16) overlap one another in the axial direction of the tire.

9 Claims, 6 Drawing Sheets

(51) Int. Cl.
*B60C 11/13* (2006.01)
*B60C 11/03* (2006.01)

(52) U.S. Cl.
CPC ...... *B60C 11/1236* (2013.01); *B60C 11/1307* (2013.01); *B60C 11/12* (2013.01); *B60C 2011/0369* (2013.01); *B60C 2011/0372* (2013.01); *B60C 2011/0381* (2013.01); *B60C 2011/0388* (2013.01); *B60C 2011/1209* (2013.01)

(56) References Cited

U.S. PATENT DOCUMENTS

2010/0314012 A1* 12/2010 Hada ................... B60C 11/0306
152/209.16
2011/0024012 A1    2/2011 Iwai

FOREIGN PATENT DOCUMENTS

| JP | 05-162512 A | * | 6/1993 |
| JP | 2001-206020 A | | 7/2001 |
| JP | 2010-64514 A | | 3/2010 |
| JP | 2010-285035 A | | 12/2010 |
| JP | 2011-31773 A | | 2/2011 |
| JP | 2012-20621 A | | 2/2012 |
| JP | 2012-51508 A | | 3/2012 |

OTHER PUBLICATIONS

Machine translation for Japan 05-162512 (no date).*
Extended European Search Report dated Oct. 20, 2015, in European Patent Application No. 13761727.0.
International Search Report issued in PCT/JP2013/056637 dated Jun. 11, 2013.

* cited by examiner

PNEUMATIC TIRE

TECHNICAL FIELD

The present invention relates to a pneumatic tire having a high wet performance while keeping steering stability and wear resistance.

BACKGROUND ART

To improve a running performance on a wet road, a pneumatic tire comprising various shapes of drainage grooves has been proposed. In addition to the drainage grooves, a pneumatic tire comprising a sipe having a narrow groove width is also proposed. The latter pneumatic tire has a higher wet performance owing to absorption efficacy and edge efficacy of a sipe.

The tread portion provided with the sipe is liable to have low rigidity, and such a tire has poor steering stability and wear resistance.

To enhance the wear resistance and comfortable ride while keeping the high wet performance, the under-mentioned Patent Document 1 discloses a pneumatic tire comprising an improved circumferential groove, sipe, and block. However, in such a pneumatic tire, there was room for further improvement in the steering stability.

Patent Document 1: Japanese Unexamined Patent Application Publication No. 2001-206020.

SUMMARY OF THE INVENTION

Problems to be Resolved by the Invention

In view of the above cases, the present invention mainly aims to provide a pneumatic tire having a high wet performance while keeping wear resistance and comfortable ride.

In the present invention, a pneumatic tire comprises a tread portion provided with a pair of circumferentially and continuously extending crown main grooves each of which is arranged on each side of the tire equator, a pair of circumferentially and continuously extending shoulder main grooves each of which is arranged axially outside of the crown main groove in each side of the tire equator, and a pair of middle land portions each of which is arranged between the crown main groove and the shoulder main groove on each side of the tire equator. Each of the middle land portions is provided with a plurality of middle sipes each having an axially inner end communicated with the crown main groove and an axially outer end communicated with the shoulder main groove, and a middle sub-groove extending between circumferentially adjacent middle sipes without intersecting with the middle sipes. Each of the middle sipes extends in an arc-like shape such that an angle with respect to the circumferential direction of the tire gradually increases from its inner end toward its outer end. A circumferential length from the outer end to the inner end of the middle sipe being in a range of from 0.6 to 1.0 times an arrangement pitch of the middle sipes. The middle sub-groove having an axially outer end communicates with the shoulder main groove and an axially inner end terminating without communicating with the crown main groove. The middle sub-groove extending in an arc-like shape such that an angle with respect to the circumferential direction of the tire gradually increases from its inner end toward its outer end. A circumferential length from the outer end to the inner end of the middle sub-groove is smaller than the circumferential length of the middle sipe. The circumferentially adjacent middle sipe and middle sub-groove overlapping one another in the axial direction of the tire.

In another aspect of the present invention, the pneumatic tire is provided wherein the middle land portion is provided with a middle auxiliary sipe between the circumferentially adjacent middle sipe and middle sub-groove. The middle auxiliary sipe includes an axially outer end communicated with the shoulder main groove, and an axially inner end terminating axially outward with respect to the inner end of the middle sub-groove. The middle auxiliary sipe extends in an arc-like shape such that an angle with respect to the circumferential direction of the tire gradually increases from its inner end toward its outer end.

In another aspect of the present invention, the pneumatic tire is provided, wherein a shoulder land portion is arranged axially outward of each of the shoulder main grooves, each of the shoulder land portions is provided with a plurality of shoulder lateral grooves each extending axially inward from a tread ground contacting edge and comprising an inner end terminating without communicating with the shoulder main groove. The shoulder land portion is provided with a plurality of shoulder first portions each sectionalized by the circumferentially adjacent shoulder lateral grooves. Each of the shoulder first portions is provided with a shoulder sipe. The shoulder sipe comprises an axially inner end communicated with the shoulder main groove, and extends in an arc-like shape at least to the tread ground-contacting edge, and not less than 70% of the plurality of shoulder first portions comprises at least two shoulder sipes.

In another aspect of the present invention, the pneumatic tire is provided, wherein a radius of curvature of the shoulder sipe is smaller than a radius of curvature of the middle sipe.

In another aspect of the present invention, the pneumatic tire is provided, wherein the shoulder sipe has a sipe depth at the side of its outer end larger than a sipe depth at the side of its inner end.

In another aspect of the present invention, the pneumatic tire is provided, wherein a radius of curvature of the shoulder sipe is in a range of from 30 to 60 mm.

Effect of the Invention

The pneumatic tire of the present invention enables to have a high wet performance while keeping steering stability and wear resistance.

EMBODIMENTS FOR CARRYING OUT THE INVENTION

Hereinafter, embodiments of the present invention will be described with referent to the drawings.

Figure 1:
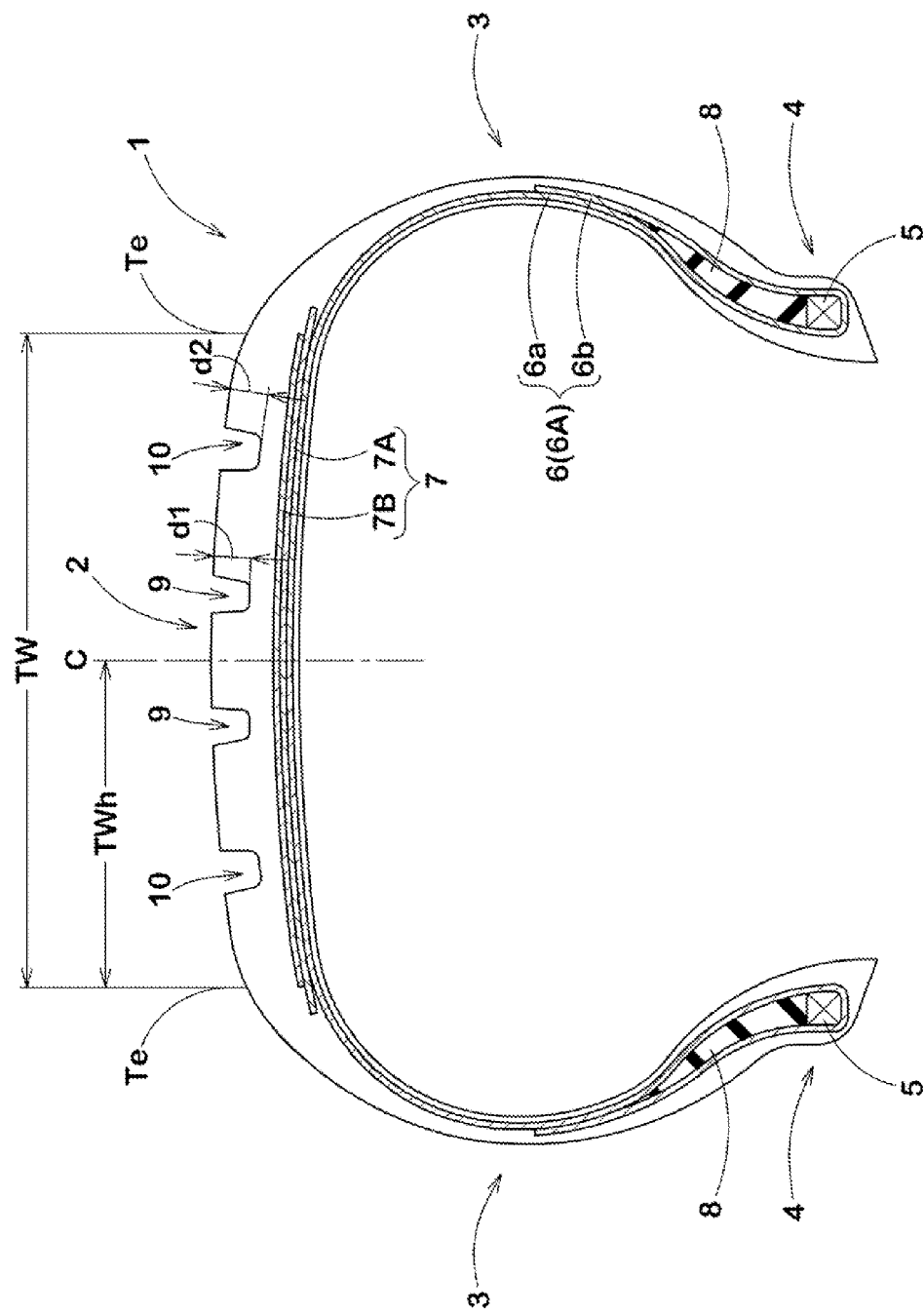
FIG. 1 is a cross-sectional view showing an embodiment of a pneumatic tire of the present invention.

FIG. 1 is a tire meridian cross-sectional view including the tire rotational axis of the pneumatic tire of the present embodiment under a standard state. In this description, unless otherwise noted, each dimension of portions of the tire including the above-mentioned dimensions is measured under the standard state where the tire is mounted on a standard rim (not shown) and is inflated to a standard pressure but loaded with no tire load.

The "standard rim" means a rim officially approved for each tire by a standard including one on which the tire is based. The standard rim is a "standard rim" in the case of JATMA, a "Design Rim" in the case of TRA, and a "Measuring Rim" in the case of ETRTO.

The "standard internal pressure" means an air pressure officially approved for each tire by the standard. The "standard internal pressure" means a maximum air pressure in JATMA, a maximum value described in a table "TIRE LOAD LIMITS AT VARIOUS COLD INFLATION PRESSURES" in the case of TRA, and "INFLATION PRESSURE" in the case of ETRTO.

As shown in FIG. 1, the pneumatic tire 1 of the present embodiment comprises a carcass 6 extending from a tread portion 2 through a sidewall portion 3 to a bead core 5 of a bead portion 4, and a belt layer 7 disposed radially outside of the carcass 6 and inward the tread portion 2. In this embodiment, the tire is embodied for passenger vehicles.

The carcass 6 is formed of a single carcass ply 6A, for example. The carcass ply 6A comprises a main portion 6a extending between the bead cores 5, 5, and a pair of turned up portions 6b each turned up around the bead core 5 from the axially inside to the outside of the ti re. A bead apex rubber 8 which extends radially outwardly from the bead core 5 in a tapered manner is disposed between the main portion 6a and the turned up portion 6b. The carcass ply 6A comprises a carcass cord arranged at an angle of from 70 to 90 degrees with respect to the tire equator C, for example. For the carcass cord, organic fiber cords such as aromatic polyamide and rayon may be used.

The belt layer 7 of the present embodiment is formed of two belt plies 7A, 7B. Each of the belt plies 7A, 7B comprises a belt cord arranged at an angle of from 15 to 45 degrees with respect to the tire equator C, for example. The belt cords are overlapped so as to intersect with each other. For the belt cord, steel cord, aramid, rayon, or the like may be used.

Figure 2:
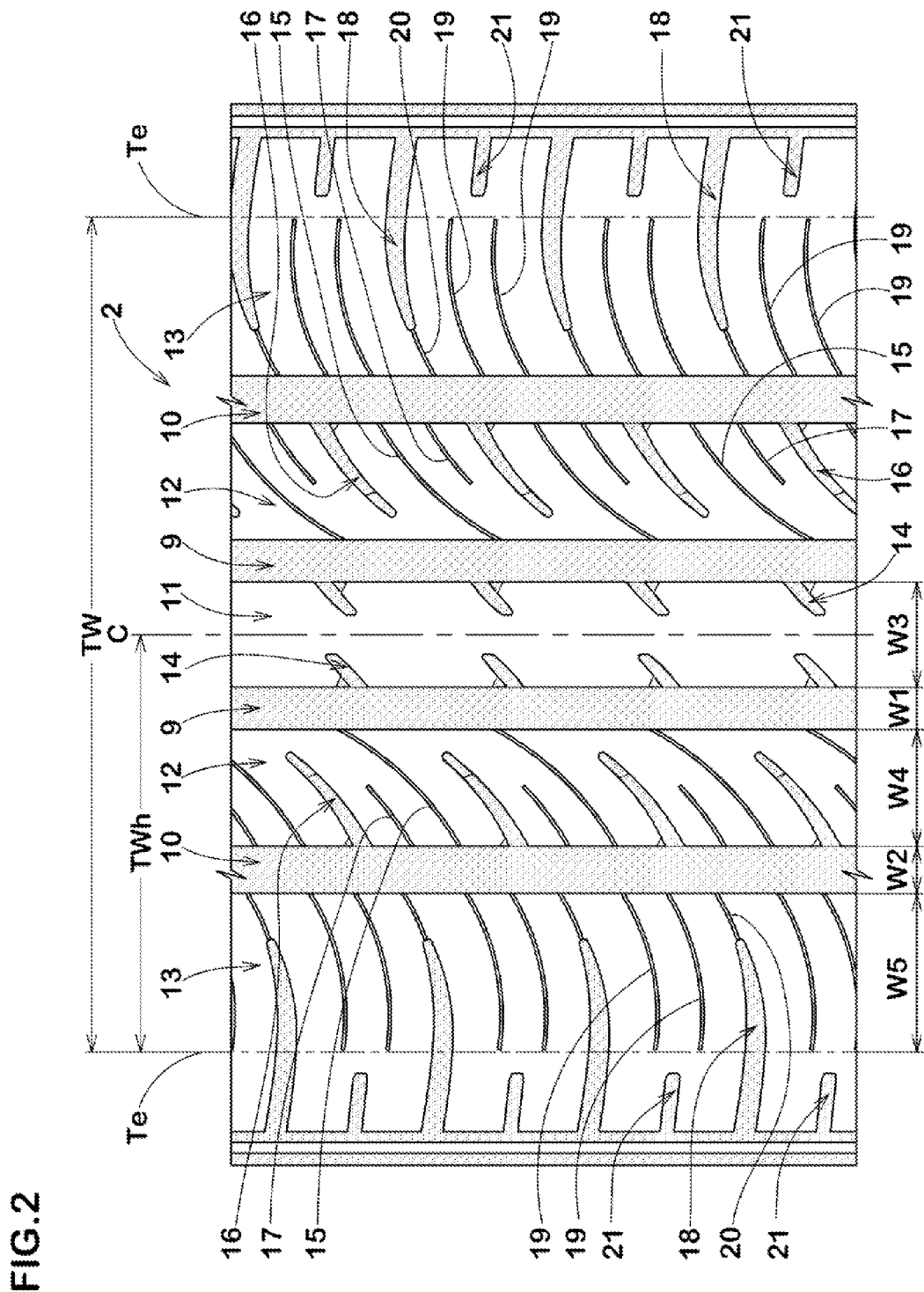
FIG. 2 is a developed view of a tread portion of FIG. 1.

FIG. 2 is a developed cross sectional view of the tread portion 2 of the pneumatic tire 1 of the present embodiment. As shown in FIG. 2, the tread portion 2 is provided with a pair of circumferentially and continuously extending crown main grooves 9 each of which is arranged on each side of the tire equator C, and a pair of circumferentially and continuously extending shoulder main grooves 10 each of which is arranged axially outside of the crown main grooves 9.

The crown main groove 9 and the shoulder main groove 10 sectionalize the tread portion 2 into a crown land portion between the pair of crown main grooves 9, middle land portions 12, 12 each of which is arranged between the crown main groove 9 and the shoulder main groove 10, and shoulder land portions 13, 13 each of which is disposed axially outward the shoulder main grooves 10.

Preferably, the tread portion 2 has a land ratio of not less than 64%, more preferably not less than 66%, and preferably not more than 72%, more preferably not more than 70% depending on the above-mentioned each groove and each land. This may offer the tire a good balance between dry performance and wet performance. The "land ratio" means a ratio of actual ground contact area to the total area of a virtual ground contact area which is obtained by plugging up all of the above-mentioned grooves between the tread ground contacting edges Te, Te.

The tread ground contacting edge Te means a ground contact edge on the axially outmost edge of the tire when the tire is contacted with a plain surface at a camber angle of zero under the standard state and loaded at a standard ti re load. The "standard tire load" means a load officially approved for each tire by the standard. The standard tire load is maximum load ability in the case of JATMA, a maximum value described in a Table "TIRE LOAD LIMITS AT VARIOUS COLD INFLATION PRESSURES" in the case of TRA, and a "LOAD CAPACITY" in the case of ETRTO.

The crown main groove 9 circumferentially extends in a linear fashion, for example, so as to discharge water from under the tire equator C during wet traveling. The crown main groove 9 is not limited to such a form but may extend in a zigzag fashion or wavelike fashion.

To improve the drainage performance and dry performance, a groove width W1 of the crown main groove 9 is preferably not less than 9%, more preferably not less than 10%, and preferably not more than 13%, more preferably not more than 12% of a tread half-width Twh. The tread half-width Twh is an axial distance from the tire equator C to one of tread ground contacting edges Te. For a specific example, in the tire for passenger vehicles of the present embodiment, the groove width W1 is preferably in a range of from 8 to 12 mm. From the same perspective, a groove depth d1 of the crown main groove 9 is preferably set in a range of from 7 to 9 mm.

The shoulder main groove 10 circumferentially extends in a linear fashion as with the crown main groove 9. However, the shoulder main groove 10 may extend in a zigzag fashion or wavelike fashion.

To improve the drainage performance and the cornering performance of the ti re, a groove width W2 of the shoulder main groove 10 is preferably not less than 10%, more preferably not less than 11%, and preferably not more than 14%, more preferably not more than 13% of the tread half-width Twh. From the same perspective, the groove depth d2 of the shoulder main groove 10 is preferably in a range of from 7 to 9 mm. Particularly the groove width W2 of the shoulder main groove 10 is preferably larger than the groove width W1 of the crown main groove 9.

Figure 3:
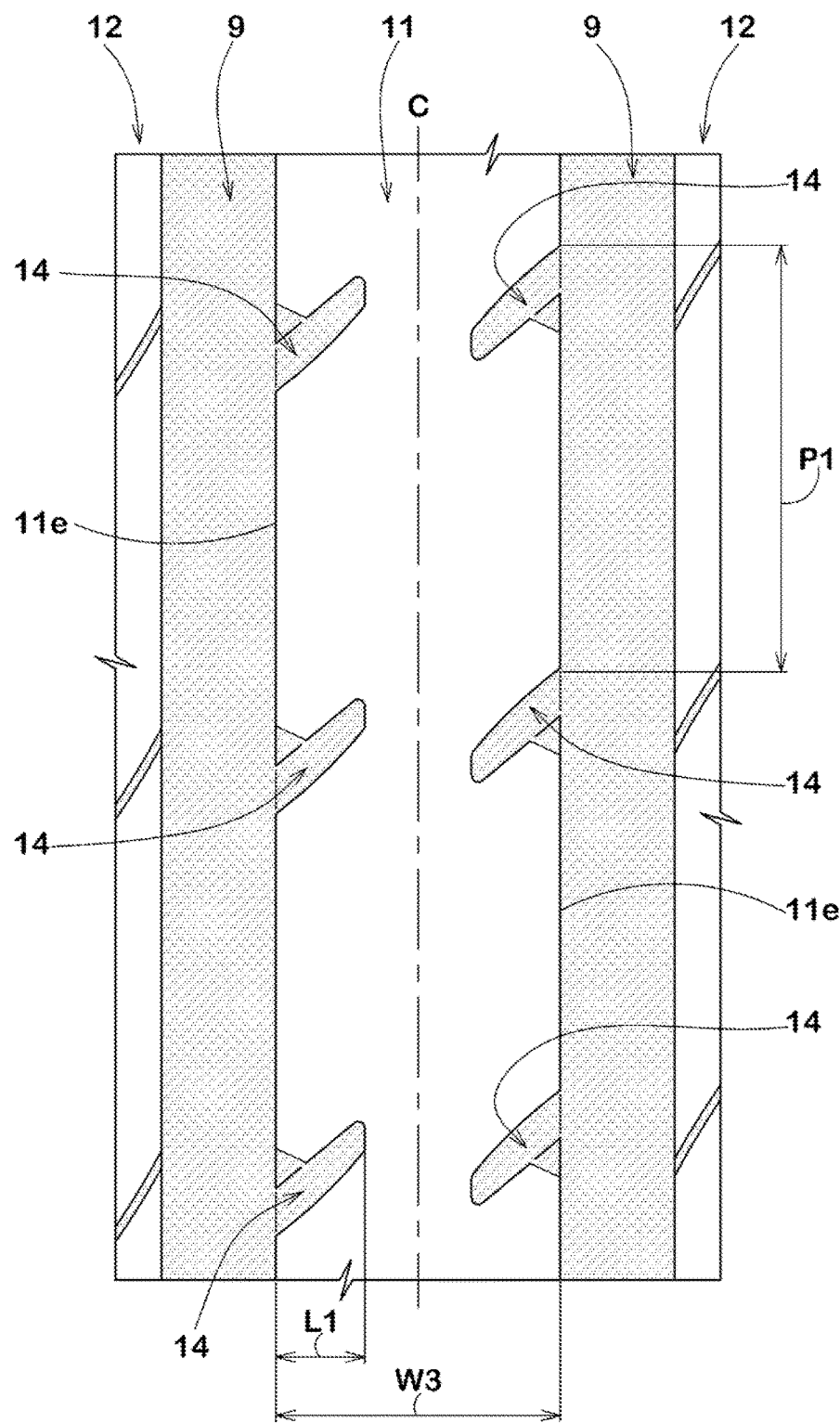
FIG. 3 is an enlarged and developed view of a crown land portion of FIG. 2.

FIG. 3 is an enlarged and developed view of a crown land portion 11. As shown in FIG. 3, the crown land portion 11 is positioned on the tire equator C.

To improve the dry performance, wet performance, and wear resistance, an axial width W3 between the side edges 11e, 11e in the ground contact surface of the crown land portion 11 is preferably not less than 22%, more preferably not less than 24%, and preferably not more than 28%, more preferably not more than 26% of the tread half-width Twh.

The crown land portion 11 comprises, for example, an inclined crown sub-groove 14 extending from the crown main groove 9 toward the tire equator C. This may help to improve the drainage capability, and the wet performance may further be improved.

To keep the excellent balance of the wet performance, steering stability, and the wear resistance, an axial groove length L1 of the crown sub-groove 14 is preferably not less than 6%, more preferably not less than 7%, and preferably not more than 11%, more preferably not more than 10% of the tread half-width Twh. From the same perspective, the groove width of the crown sub-groove 14 is preferably in a range of from 2.5 to 3.5 mm, and the groove depth is preferably in the range of from 4.5 to 6.5 mm.

To improve the wet performance while preventing uneven wear of the crown land portion 11, a circumferential arrangement pitch pi of the crown sub-groove 14 is preferably not less than 3%, more preferably not less than 4%, and preferably not more than 7%, more preferably not more than 6% of the tire external diameter.

Figure 4:
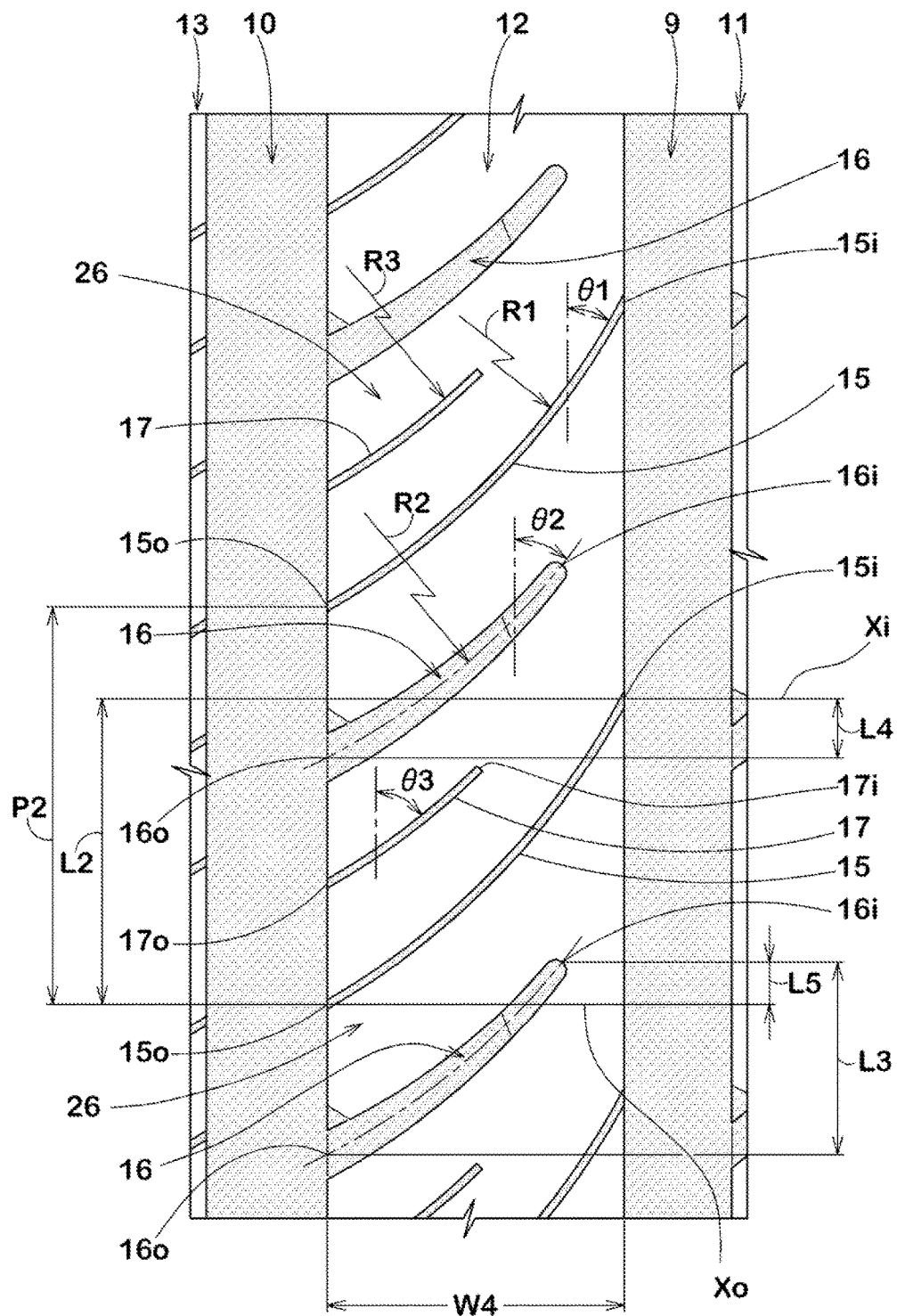
FIG. 4 is an enlarged and developed view of a middle land portion of FIG. 2.

FIG. 4 is an enlarged and developed view of a middle land portion 12. As shown in FIG. 4, the middle land portion 12 is provided with a plurality of middle sipes 15, and a plurality of middle sub-grooves 16.

A width W4 of the middle land portion 12 is preferably larger than the width W3 of the crown land portion 11. This may make the ground pressure of the crown land portion 11 and the middle land portion 12 proper and may prevent the uneven wear. The width W4 is preferably not less than 24%, more preferably not less than 26%, and preferably not more than 32%, more preferably not more than 30% of the tread half-width Twh, in order to improve the dry performance, wear resistance, and wet performance in a well-balanced manner. In the pneumatic tire for passenger vehicles of the present embodiment, the width W4 is preferably in a range of from 20 to 25 mm.

The middle sipes P2 are arranged in the circumferential direction of the tire with an arrangement pitch P2. The arrangement pitch P2 is preferably in a range of from 3% to 7% of the tire external diameter.

The middle sipe 15 comprises an axially inner end 15i communicated with the crown main groove 9, and an axially outer end 15o communicated with the shoulder main groove 10. During wet traveling, such a middle sipe 15 may absorb water between the tread portion 2 and a road surface, and may discharge part of it axially outward. Therefore, the wet performance of the tire may improve. In order to further improve the good balance of the rigidity and the drainage capability of the middle land portion 12, the sipe width of the middle sipe 15 is preferably in a range of from 0.6 to 1.0 mm, for example, and the sipe depth is preferably in a range of from 2.0 to 3.0 mm, for example.

The middle sipe 15 has an angle θ1 with respect to the circumferential direction of the tire, and the angle θ1 gradually increases from the inner end 15i toward the outer end 15o so as to be inflected in an arc-like shape. Such a middle sipe 15 has a small angle θ1 on the side of the crown main groove 9 and has a large angle θ1 on the side of the shoulder main groove 10. Therefore, the middle land portion 12 has a high circumferential rigidity in the side of the crown main groove 9 where a comparatively large ground pressure tends to be acted during straight running, and has a large axial rigidity in the side of the shoulder main groove 10 where a comparatively large ground pressure tends to be acted during cornering. Thus the rigidity of the middle land portion 12 is appropriately kept, and the steering stability and wear resistance are improved. Moreover, it is preferable that the arc-like middle sipe 15 has a longer edge length than a straight sipe.

The angle θ1 of the middle sipe 1S is preferably in a range of from 30 to 40 degrees at the inner end 15i and from 55 to 65 degrees at the outer end 15o in order to keep a good balance between the drainage performance and the circumferential rigidity of the middle land portion 12.

To smoothly vary the rigidity of the middle land portion 12 while enlarging the edge, radius of curvature R1 showing a curvature degree of the middle sipe 15 is preferably not less than 30 mm, more preferably not less than 50 mm, and preferably not more than 90 mm, more preferably not more than 70 mm.

The middle sipe 15 has a circumferential length L2 from the outer end 15o to the inner end 15i in a range of from 0.6 to 1.0 times the arrangement pitch P2. This improves the good balance between the rigidity and drainage performance of the middle land portion 12 so as to improve the steering stability, the wear resistance and the wet performance at the same time. When the length L2 is less than 0.6 times the arrangement pitch P2, the wet performance possibly deteriorates. When the length L2 is more than 1.0 times the arrangement pitch P2, the steering stability and the wear resistance possibly deteriorate.

The middle sub-groove 16 is arranged between the circumferentially adjacent middle sipes 15, 15, without intersecting with the middle sipes 15. The middle sub-groove 16 has an axial outer end 16o communicating with the shoulder main groove 10. The axially inner end 16i of the middle sub-groove 16 terminates without communicating with the crown main groove 9. As with the improvement of the steering stability and the wear resistance of the tire, such a middle sub-groove 16 can keep the rigidity of the middle land portion 12 while improving the wet performance.

As with extending in a curve in an arc-like fashion, the angle θ2 of the middle sub-groove 16 with respect to the tire circumferential direction gradually increases from its inner end 16i toward its outer end 16o. As with the middle sipe 15, such a middle sub-groove 16 may improve the wet performance while improving the steering stability and the wear resistance. To balance the rigidity and the drainage capability of the middle land portion 12, the angle θ2 is preferably in a range of from 40 to 60 degrees. From the same perspective, the groove width of the middle sub-groove 16 is preferably set to in a range of from 2.0 to 4.0 mm, for example, and the groove depth is set to in a range of from 4.0 to 7.0 mm, for example.

To improve the drainage capability while enlarging the edge, a radius of curvature R2 showing a curvature degree of the middle sub-groove 16 is preferably not less than 25 mm, more preferably not less than 45 mm, and preferably not more than 75 mm, more preferably not more than 55 mm.

A circumferential length L3 of the middle sub-groove 16 from the outer end 16o to the inner end 16i is smaller than the circumferential length L2 of the middle sipe 15. This prevents the rigidity deterioration of the middle land portion 12 caused by the middle sub-groove 16.

To prevent the rigidity deterioration of the middle land portion 12 while improving the wet performance, the length L3 of the middle sub-groove 16 is preferably not less than 50%, more preferably not less than 60%, and preferably not more than 80%, more preferably not more than 70% of the arrangement pitch P2 of the middle sipe 15.

The middle sipe 15 and the middle sub-groove 16, which are adjacent in the circumferential direction of the tire, are arranged so as to overlap one another in the axial direction of the tire. That is to say, as is clear from FIG. 4, an axial straight line xi passing through the inner end 15i of the middle sipe 15 intersects with the middle sub-groove 16. In the same way, an axial straight line xo passing through the outer end 15i of the middle sipe 15 intersects with another middle sub-groove 16. Such an arrangement of the middle sipe 15 and the middle sub-groove 16 furthers improves the wet performance of the tire.

To prevent the rigidity deterioration of the middle land portion 12 while sufficiently improving the wet performance, a circumferential overlapping length L4 between the inner end 15i of the middle sipe 15 and the outer end 16o of the middle sub-groove 16, and a circumferential overlapping length L5 between the outer end 15o of the middle sipe 15 and the inner end 16i of the middle sub-groove 16 are preferably not less than 8%, more preferably not less than 10%, and preferably not more than 15%, more preferably not more than 13% of the arrangement pitch P2 of the middle sipe 15.

Preferably, the middle land portion 12 is provide with a middle auxiliary sipe 17 between the circumferentially adjacent middle sipe 15 and middle sub-groove. The middle auxiliary sipe 17 uniformizes the rigidity of the middle land portion 12 and further improves drainage performance of the middle sipe 15 and the middle sub-groove 16. To uniformize the rigidity of the middle land portions, a sipe width of the middle auxiliary sipe 17 is preferably in a range of from 0.6 to 1.0 mm, and a sipe depth is preferably in a range of from 2.0 to 3.0 mm, respectively.

The middle auxiliary sipe 17 includes an axially outer end 17o communicated with the shoulder main groove 10. An axially inner end 17i of the middle auxiliary sipe 17 terminates axially outward with respect to the inner end 16i of the middle sub-groove 16. Such a middle auxiliary sipe 17 may improve the drainage performance while keeping the rigidity of the middle land portion 12 on the side of the tire equator.

Preferably, in the middle auxiliary sipe 17, as with extending in an arc-like fashion, the angle θ3 with respect to the circumferential direction of the tire gradually increases from the inner end 17i to the outer end 17o. The middle auxiliary sipe 17 of the present embodiment extends along the middle sipe 15. The angle θ3 is preferably in a range of from 45 to 70 degrees to improve the rigidity and the drainage capability of the middle land portion 12.

To enlarge the edge while improving the drainage performance, a radius of curvature R3 of the middle auxiliary sipe 17 is preferably not less than 30 mm, more preferably not less than 50, and preferably not more than 90 mm and more preferably not more than 70 mm.

Between the circumferentially adjacent middle sub-grooves 16, 16, a block-like middle first portion 26 is arranged. At least one middle first portion 26 is provided with the middle sipe 15, and the middle auxiliary sipe 17. More preferably, the middle first portion 26 is provided with each one of the middle sipe 15 and the middle auxiliary sipe 17. Moreover, among the middle first portion 26 in the tire, preferably not less than 70%, more preferably not less than 80% of the middle first portion 26 preferably comprises at least one middle sipe 15 and one middle auxiliary sipe 17.

In the present embodiment, the middle sipe 15, the middle sub-groove 16, and the middle auxiliary sipe 17 incline in the same direction. In the present embodiment, the middle sipe 15, the middle sub-groove 16, and the middle auxiliary sipe 17 are arc-like and convex in the same direction. This further uniformizes the rigidity of the middle land portion 12 and improves the steering stability and uneven wear resistance.

Figure 5:
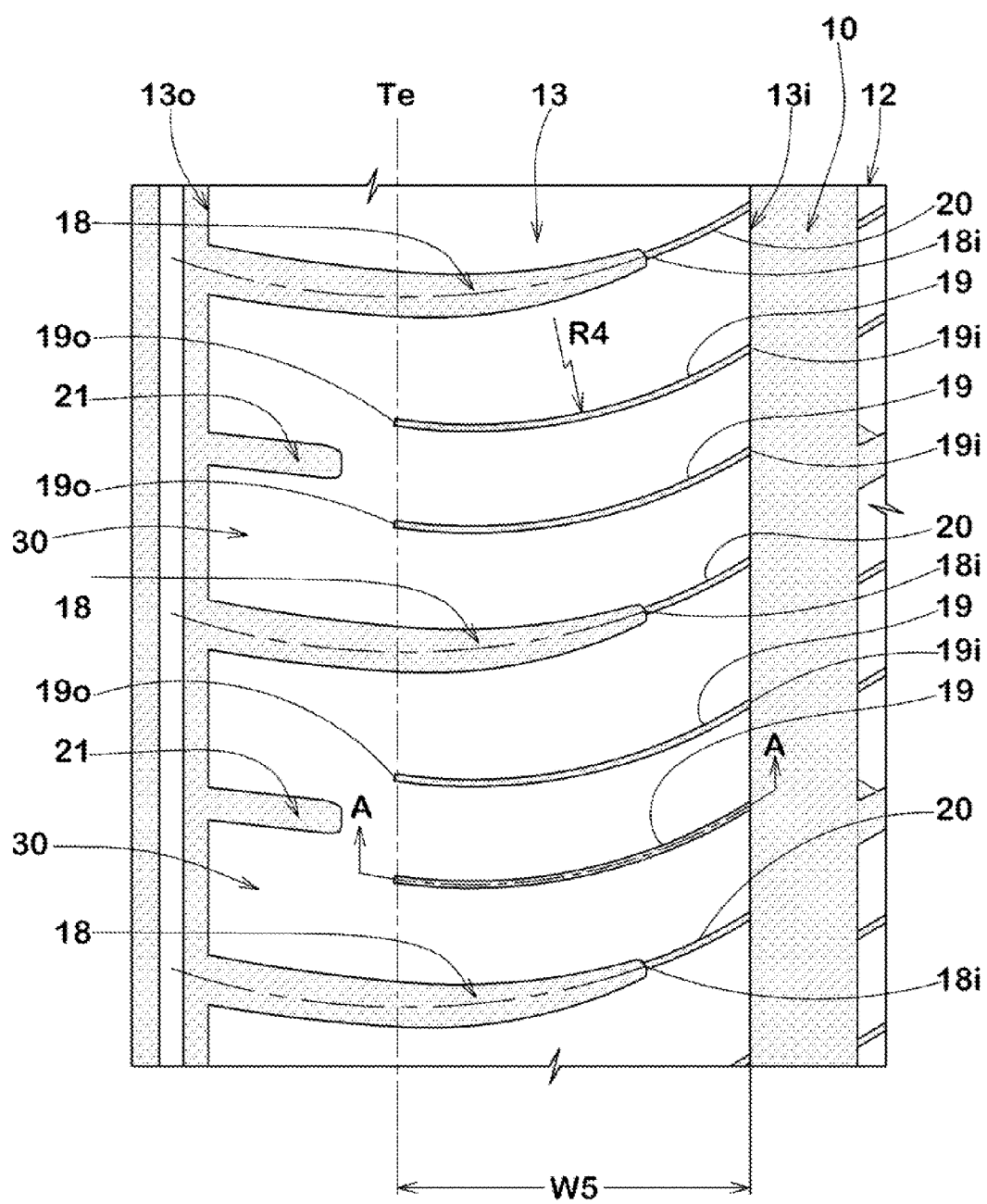
FIG. 5 is an enlarged and developed view of a shoulder land portion of FIG. 2.

FIG. 5 is an enlarged and developed view of a shoulder land portion 13. As shown in FIG. 5, the shoulder land portion 13 comprises a plurality of shoulder lateral grooves 18, a plurality of shoulder sipes 19.

The width W5 of the shoulder land portion 13 is preferably formed to be larger than the width W4 of the middle land portion 12 so as to improve the wear resistance of the middle land portion 12 and the shoulder land portion 13. The width W5 is preferably not less than 44%, more preferably not less than 46%, and preferably not more than 52%, more preferably not more than 50% of the tread half-width Twh in order to improve the steering stability and wear resistance in a good balance.

The shoulder lateral groove 18 extends at least from the tread ground contacting edge Te inwardly in the axial direction of the tire. More preferably, to improve wandering property, the shoulder lateral groove 18 preferably extends inwardly in the axial direction of the tire from an axially outer position with respect to the tread ground contacting edge Te.

Preferably, the shoulder lateral groove 18 comprises an inner end 18i terminating without communicating with the shoulder main groove 10. Thus the shoulder land portion 13 has high rigidity on the axially inner side, and the steering stability is improved. From the same perspective, the groove width of the shoulder lateral groove 18 is preferably in a range of from 2.0 to 5.0 mm, for example, and the groove depth is preferably in a range of from 4.0 to 7.0 mm.

The shoulder lateral groove 18 preferably extends in an arc-like and convex in the same direction as the middle sub-groove 16 of the adjacent middle land portion 12. This uniformizes the rigidity of the middle land portion 12 and the shoulder land portion 13 and reduces the uneven wear.

Between the inner end 18i of the shoulder lateral groove 18 and the axial inner end edge 13i of the shoulder land portion 13, a shoulder auxiliary sipe 20 which communicate with both of them is arranged. This further improves drainage performance of the shoulder main groove 10 while keeping the rigidity of the shoulder land portion 13 and also improves wet performance while keeping the steering stability and the wear resistance.

A shoulder sipe 19 is arranged between the shoulder lateral grooves 18, 18, which are adjacent one another in the circumferential direction of the tire. The shoulder sipe 19 includes an axially inner end 19i preferably communicated with the shoulder main groove 10. This further improves the drainage performance of the shoulder main groove 10. An axially outer end 19o of the shoulder sipe 19 is preferably positioned at least at the tread ground contacting edge Te. Preferably, the outer end 19o of the shoulder sipe 19 is preferably positioned axially outwardly with respect to the tread ground contacting edge Te in order to further improve the wet performance.

The shoulder land portion 13 is sectioned into a plurality of shoulder first portions 30. Each of the shoulder first portions 30 is arranged between the circumferentially adjacent shoulder lateral grooves 18, 18. At least one shoulder first portion 30 preferably provided with at least one, preferably two, shoulder sipes 19. Furthermore, preferably not less than 70%, more preferably not less than 80% of the shoulder first portions 30 of the tire 1 is preferably provided with at least each two shoulder sipes 19. This improves the absorption efficacy and edge efficacy by the sipe and further improves the wet performance.

The shoulder sipe 19 preferably extends in an arc-like fashion. More preferably, the shoulder sipe 19 is formed as an arc-like shape with a convex in the same direction as the middle sipe 15. This improves the cornering performance while wet running. Preferably, a radius of curvature R4 showing a curvature degree of the shoulder sipe 19 is smaller than the radius of curvature R1 of the middle sipe 15. This further produces the above-mentioned edge efficacy of the shoulder land portion 13.

The radius of curvature R4 is preferably not less than 30 mm, more preferably not less than 40 mm, and more preferably not more than 70 mm, more preferably not more than 60 mm.

Figure 6:
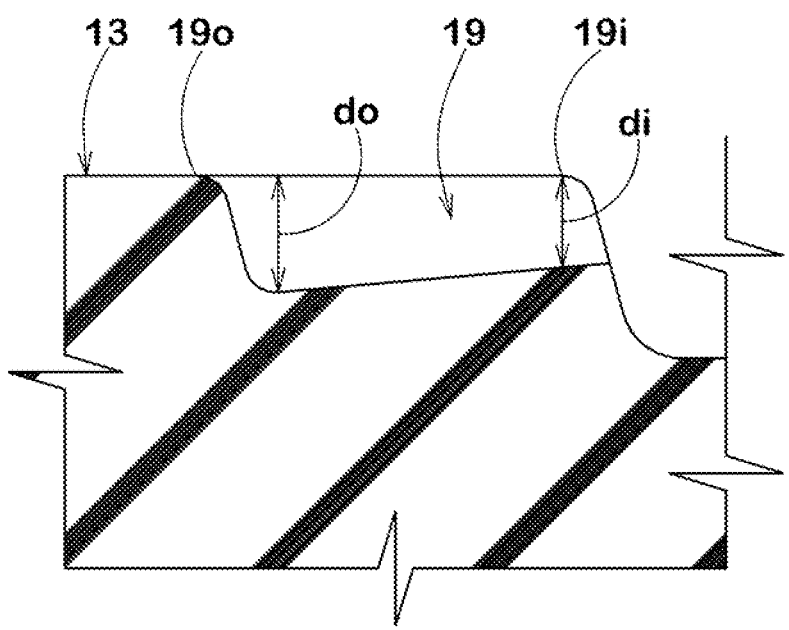
FIG. 6 is an enlarged and cross-sectional view taken on line A-A of FIG. 5.

FIG. 6 is an enlarged cross-sectional view taken on line A-A of the shoulder sipe 19 shown in FIG. 5. As shown in FIG. 6, the shoulder sipe 19 preferably has the sipe depth (do) on an outer end 19o larger than the sipe depth (di) on an inner end 19i. More preferably, the shoulder sipe 19 comprises a part where the sipe depth gradually increases from the inner end 19i toward the outer end 19o. This relatively improves the rigidity on the axially inner side and improves the uneven wear resistance.

As shown in FIG. 5, between the circumferential adjacent shoulder lateral grooves 18, 18, a shoulder sub-groove 21 is preferably arranged. The shoulder sub-groove 21 extends from an axially outer end edge 13o of the shoulder land portion 13 toward the axially inward to improve the wandering property, and terminates without communicating with the tread ground contacting edge Te. The axial length of the shoulder sub-groove 21 is smaller than that of the shoulder lateral groove 18.

Although the present invention, has been described in detail, needless to say, the invention is not limited to the above-mentioned specific embodiments, and various modifications can be made.

EXAMPLES

Pneumatic tires having a basic structure shown in FIG. 1 and a tire size of 195/60R14 were manufactured for trial based on a specification shown in Table 1, and were tested their wear resistance and wet braking property. For comparison, a tire comprising nether middle sipe, nor middle auxiliary sipe, nor shoulder sipe (Comparative Example 1) was tested in the same way. The test method was as follows.

Wear Resistance Test:

The test tires were mounted on a rim (14×7J) of all-while of a passenger vehicle under an internal pressure (230 kPa) for all wheels of a vehicle (1,600 cc), and a groove depth of a crown main groove was measured after running 5,000 km. Evaluation was displayed using indices with Comparative Example 1 being 100. The larger the numeric value was, the more excellent it was in wear resistance.

Steering Stability Test:

A single driver ran in the above-mentioned vehicle on a dry asphalt road surface of a test course, and handling response while cornering, rigid impression, and grip performance were evaluated in a driver's feeling test. Evaluation was displayed using indices with Comparative Example 1 being 100. The larger the numeric value was, the more excellent it was in steering stability.

Wet Braking Property Test:

The above-mentioned vehicle went into a wet asphalt road having water film of from 1.4 to 1.6 mm at a speed of 60 km/h, and a braking distance was measured until the vehicle completely stopped. Evaluation was defined as the reciprocal of each braking distance and displayed using indices with Comparative Example 1 being 100. The larger the numeric value was, the more excellent it was in wet braking property.

TABLE 1

|  | Com. Ex. | Ex. 1 | Com. Ex. 2 | Ex. 2 | Ex. 3 | Com. Ex. 3 | Com. Ex. 4 | Com. Ex. 5 |
|---|---|---|---|---|---|---|---|---|
| Circumferential length L2 of middle sipe (mm) | — | 23.5 | 23.5 | 23.5 | 23.5 | 23.5 | 23.5 | 23.5 |
| Circumferential length L2 of middle sipe/arrangement pitch P2 | — | 0.78 | 0.50 | 0.60 | 1.00 | 1.10 | 0.78 | 0.78 |
| Range of angle θ1 of middle sipe with respect to the circumferential direction of tire (degree) | — | 30-55 | 30-55 | 30-55 | 30-55 | 30-55 | 30-55 | 30-55 |
| Radius of curvature R1 of middle sipe (mm) | — | 60.0 | 60.0 | 60.0 | 60.0 | 60.0 | 60.0 | 60.0 |
| Circumferential direction L3 of middle sub-groove with respect to the circumferential direction of tire (mm) | 15.0 | 15.0 | 15.0 | 15.0 | 15.0 | 15.0 | 25.0 | 15.0 |
| Range of angle θ2 of middle sub-groove with respect to the circumferential direction of tire (degree) | 40-60 | 40-60 | 40-60 | 40-60 | 40-60 | 40-60 | 40-60 | 40-60 |
| Presence/absence of overlapping of middle sipe and middle sub-groove | — | Presence | Presence | Presence | Presence | Presence | Presence | None |
| Presence/absence of middle auxiliary sipe | — | Presence | Presence | Presence | Presence | Presence | Presence | Presence |
| Range of angle θ3 of middle auxiliary sipe with respect to the circumferential direction of tire (degree) | — | 40-60 | 40-60 | 40-60 | 40-60 | 40-60 | 40-60 | 40-60 |
| Presence/absence of shoulder sipe | None | Presence | Presence | Presence | Presence | Presence | Presence | Presence |
| The number of shoulder sipes between shoulder lateral grooves | — | 2 | 2 | 2 | 2 | 2 | 2 | 2 |
| Radius of curvature R4 of shoulder sipe (mm) | — | 45.0 | 45.0 | 45.0 | 45.0 | 45.0 | 45.0 | 45.0 |
| Sipe depth (di) of shoulder sipe on inner side (mm) | — | 2.0 | 2.0 | 2.0 | 2.0 | 2.0 | 2.0 | 2.0 |
| Sipe depth (do) of shoulder sipe on outer side (mm) | — | 3.0 | 3.0 | 3.0 | 3.0 | 3.0 | 3.0 | 3.0 |
| Wear resistance (index) | 100 | 110 | 111 | 111 | 107 | 103 | 105 | 110 |
| Steering stability (index) | 100 | 110 | 111 | 110 | 109 | 103 | 110 | 110 |
| Wet braking performance (index) | 100 | 110 | 103 | 108 | 111 | 112 | 110 | 105 |

|  | Ex 4 | Ex. 5 | Ex. 6 | Ex. 7 | Ex. 8 | Ex. 9 | Ex. 10 | Ex. 11 |
|---|---|---|---|---|---|---|---|---|
| Circumferential length L2 of middle sipe (mm) | 23.5 | 23.5 | 23.5 | 23.5 | 23.5 | 23.5 | 23.5 | 23.5 |
| Circumferential length L2 of middle sipe/arrangement pitch P2 | 0.78 | 0.78 | 0.78 | 0.78 | 0.78 | 0.78 | 0.78 | 0.78 |

TABLE 1-continued

| | | | | | | | | |
|---|---|---|---|---|---|---|---|---|
| Range of angle θ1 of middle sipe with respect to the circumferential direction of tire (degree) | 30-55 | 30-55 | 30-55 | 30-55 | 30-55 | 30-55 | 30-55 | 30-55 |
| Radius of curvature R1 of middle sipe (mm) | 60.0 | 60.0 | 60.0 | 60.0 | 60.0 | 60.0 | 60.0 | 60.0 |
| Circumferential direction L3 of middle sub-groove with respect to the circumferential direction of tire (mm) | 15.0 | 15.0 | 15.0 | 15.0 | 15.0 | 15.0 | 15.0 | 15.0 |
| Range of angle θ2 of middle sub-groove with respect to the circumferential direction of tire (degree) | 40-60 | 40-60 | 40-60 | 40-60 | 40-60 | 40-60 | 40-60 | 40-60 |
| Presence/absence of overlapping of middle sipe and middle sub-groove | Presence | Presence | Presence | Presence | Presence | Presence | Presence | Presence |
| Presence/absence of middle auxiliary sipe | None | Presence | Presence | Presence | Presence | Presence | Presence | Presence |
| Range of angle θ3 of middle auxiliary sipe with respect to the circumferential direction of tire (degree) | — | 40-60 | 40-60 | 40-60 | 40-60 | 40-60 | 40-60 | 40-60 |
| Presence/absence of shoulder sipe | Presence | None | Presence | Presence | Presence | Presence | Presence | Presence |
| The number of shoulder sipes between shoulder lateral grooves | 2 | — | 1 | 3 | 2 | 2 | 2 | 2 |
| radius of curvature R4 of shoulder sipe (mm) | 45.0 | — | 45.0 | 45.0 | 60.0 | 70.0 | 45.0 | 45.0 |
| Sipe death (di) of shoulder sipe on inner side (mm) | 2.0 | — | 2.0 | 2.0 | 2.0 | 2.0 | 3.0 | 3.0 |
| Sipe depth (do) of shoulder sipe on outer side (mm) | 3.0 | — | 3.0 | 3.0 | 3.0 | 3.0 | 3.0 | 2.0 |
| Wear resistance (index) | 110 | 111 | 111 | 107 | 110 | 110 | 110 | 110 |
| Steering stability (index) | 110 | 113 | 112 | 108 | 108 | 106 | 107 | 108 |
| Wet braking performance (index) | 108 | 105 | 106 | 112 | 109 | 108 | 110 | 110 |

As is clear from Table 1, it was confirmed that the pneumatic tire of the examples had high wet performance while keeping steering stability and wear resistance.

EXPLANATION OF THE REFERENCE

9 Crown main groove
10 Shoulder main groove
11 Crown land portion
12 Middle land portion
13 Shoulder land portion
14 Crown sub-groove
15 Middle sipe
16 Middle sub-groove
17 Middle auxiliary sipe
18 Shoulder lateral groove
19 Shoulder sipe
20 Shoulder auxiliary sipe
21 Shoulder sub-groove

The invention claimed is:
1. A pneumatic tire comprising:
a tread portion provided with
a pair of circumferentially and continuously extending crown main grooves each of which is arranged on each side of the tire equator, wherein each of the crown main grooves has a
pair of groove edges extending in a linear fashion,
a pair of circumferentially and continuously extending shoulder main grooves each of which is arranged axially outside of the crown main groove on each side of the tire equator wherein each of the shoulder main grooves has a pair of groove edges extending in a linear fashion and the groove widths of the shoulder main grooves are larger than the groove widths of the crown main grooves, and
a pair of middle land portions each of which is arranged between the crown main groove and the shoulder main groove on each side of the tire equator;
each of the middle land portions provided with a plurality of middle sipes each having an axially inner end communicated with the crown main groove and an axially outer end communicated with the shoulder main groove, and a middle sub-groove extending between circumferentially adjacent middle sipes without intersecting with the middle sipes;
each of the middle sipes extending in an arc-like shape such that an angle with respect to the circumferential direction of the tire gradually increases from its inner end toward its outer end;
a circumferential length from the outer end to the inner end of the middle sipe being in a range of from 0.6 to 1.0 times an arrangement pitch of the middle sipes;
the middle sub-groove having an axially outer end communicates with the shoulder main groove and an axially inner end terminating without communicating with the crown main groove;
the middle sub-groove extending in an arc-like shape such that an angle with respect to the circumferential direction of the tire gradually increases from its inner end toward its outer end;
a circumferential length from the outer end to the inner end of the middle sub-groove being smaller than the circumferential length of the middle sipe; and
the circumferentially adjacent middle sipe and middle sub-groove overlapping one another in the axial direction of the tire.
2. The pneumatic tire according to claim 1,
wherein the middle land portion is provided with a middle auxiliary sipe between circumferentially adjacent middle sipe and middle sub-groove, the middle auxiliary sipe includes an axially outer end communicated with the shoulder main groove, and an axially inner end terminating axially outward with respect to the inner end of the middle sub-groove, and the middle auxiliary sipe extends in an arc-like shape such that an angle with respect to the circumferential direction of the tire gradually increases from its inner end toward its outer end.

3. The pneumatic tire according to claim 1, wherein a shoulder land portion is arranged axially outward of each of the shoulder main grooves, each of the shoulder land portions is provided with a plurality of shoulder lateral grooves each extending axially inward from a tread ground contacting edge and comprising an inner end terminating without communicating with the shoulder main groove, the shoulder land portion is provided with a plurality of shoulder first portions each sectionalized by the circumferentially adjacent shoulder lateral grooves, each of the shoulder first portions is provided with a shoulder sipe, the shoulder sipe comprising an axially inner end communicated with the shoulder main groove, and extending in an arc-like shape at least to the tread ground-contacting edge, and not less than 70% of the plurality of shoulder first portions comprises at least two shoulder sipes.

4. The pneumatic tire according to claim 3, wherein a radius of curvature of the shoulder sipe is smaller than a radius of curvature of the middle sipe.

5. The pneumatic tire according to claim 3, wherein the shoulder sipe has a sipe depth at the side of its outer end larger than a sipe depth at the side of its inner end.

6. The pneumatic tire according to claim 3, wherein a radius of curvature of the shoulder sipe is in a range of from 30 to 60 mm.

7. The pneumatic tire according to claim 1, the tread portion further comprising a crown land portion arranged between the pair of crown main grooves, wherein the crown land portion is provided with inclined crown sub-grooves extending from both crown main grooves toward the tire equator and terminating within the crown land portion, and the crown sub-grooves and the middle sub-grooves are angled in the same direction.

8. The pneumatic tire according to claim 1, wherein each of the middle sipe has a width in a range of from 0.6 to 1.0 mm, and the axially inner end of each of the middle sipes is directly in communication with the crown main groove.

9. The pneumatic tire according to claim 1, wherein a circumferential overlapping length (L4) between an inner end of one of the circumferentially adjacent middle sipes and the outer end of the middle sub-groove is in a range of from 8% to 15% of arrangement pitches (P2) of the middle sipes in the circumferential direction of the tire.

\* \* \* \* \*